United States Patent [19]
von Haas et al.

[11] Patent Number: 4,958,968
[45] Date of Patent: Sep. 25, 1990

[54] ADAPTER FOR MACHINE-TOOL SPINDLE

[75] Inventors: Rainer von Haas, Geesthacht; Willi Jester, Herten, both of Fed. Rep. of Germany

[73] Assignee: Krupp Widia GmbH, Essen, Fed. Rep. of Germany

[21] Appl. No.: 425,711

[22] Filed: Oct. 23, 1989

[30] Foreign Application Priority Data

Oct. 21, 1988 [DE] Fed. Rep. of Germany ....... 3835879

[51] Int. Cl.$^5$ .............................................. B23C 1/04
[52] U.S. Cl. ................................... 409/232; 279/1 A; 279/22; 279/75; 408/239 R; 409/234
[58] Field of Search .................. 82/165, 150; 409/231, 409/232, 233, 234; 408/239 R, 240; 279/1 A, 1 SG, 22, 30, 75

[56] References Cited
U.S. PATENT DOCUMENTS

| | | | |
|---|---|---|---|
| 3,684,303 | 8/1972 | Serra | 409/231 |
| 4,411,568 | 10/1983 | Röhm | 409/233 |
| 4,585,380 | 4/1986 | Naito | 409/234 |
| 4,714,389 | 12/1987 | Johne | 409/233 |
| 4,863,323 | 9/1989 | Glaser | 409/232 |

*Primary Examiner*—William E. Terrell
*Assistant Examiner*—Mark F. Frazier
*Attorney, Agent, or Firm*—Herbert Dubno; Andrew Wilford

[57] ABSTRACT

A machine spindle is formed with an axially centered forwardly flared large-diameter seat, provided in the seat with at least two axially and radially displaceable spindle jaws, having an axially displaceable actuating rod axially coupled with the jaws, and formed with cam formations engageable with the jaws to move same together on axial rearward displacement. A transfer body or a tool is normally also centered on the axis and formed with an axially centered rearwardly tapered small-diameter stem substantially smaller than the seat. An adapter comprises an adapter body normally centered on the axis and formed with a forwardly open small-diameter adapter seat complementary with the tool stem, a rearwardly projecting adapter stem snugly receivable in the large-diameter seat of the spindle, a flange flatly engageable with the front end of the spindle when the stem is in the spindle seat, and at least one rearwardly projecting tongue having a radially deflectable rear end engageable between a respective one of the jaws and the spindle when the stem is in the spindle seat to press the one jaw radially inward. A connector rod is axially limitedly displaceable in the adapter body between a front position and a rear position and has a rear end formed as a head engageable by the jaws. At least one member engageable between the rod and the tool stem to lock the tool in the adapter seat when the connector rod is in the rear position.

15 Claims, 3 Drawing Sheets

ADAPTER FOR MACHINE-TOOL SPINDLE

FIELD OF THE INVENTION

The present invention relates to an adapter for a machine-tool spindle More particularly this invention concerns an adapter used to fit a small-caliber tapered tool shaft into the large-diameter tapered bore of a machine-tool spindle.

BACKGROUND OF THE INVENTION

A standard machine-tool spindle rotatable about an axis is formed centered on this axis with a large-diameter frustoconically tapered bore or seat, for example corresponding to DIN 2079. In the inner or rear end of this seat are at least two angularly equispaced gripper jaws which are carried on an axially movable actuating element and which can move radially and axially. These jaws coact with cam surfaces of the spindle such that when these jaws are retracted axially backward by the actuating element they move together and when pushed axially forward they separate.

A tool for use with such a spindle has a stem or shank that is of a shape and size complementary to the seat of the spindle. In addition the tool stem has a head formed with a shoulder the jaws can grip around so that as they pull backward they grip this head and pull the tool stem tightly into the seat. The element carrying the jaws is a rod that can be spring loaded or hydraulically or pneumatically actuated or even operated by centrifugal force when the spindle is rotated. This element also normally has an end that can abut the inner end of the tool stem when this rod and its jaws are advanced axially fully forward to knock the tool loose from its tight friction fit in the tapered seat.

In order to transmit the maximum possible torque from the tool to the spindle it is necessary to make the seat and tool stem as large in diameter as possible. When, however, a finer machining operation is being carried out, it is frequently necessary to chuck a much smaller-diameter tool in the spindle. To this end an adapter is used which at one side fits with the large-diameter seat of the spindle and on the opposite side has a small-diameter seat for the tool.

Such an adapter is described in German patent No. 3,506,901 filed 27 Feb. 1986 by G. Liebau. It has a body with a stem adapted to fit complementarily in the seat of the spindle and with a flange adapted to fit flush against the front face of the spindle. This body is formed centered on the spindle axis with a forwardly opening small-diameter tapered bore shaped, for example to ISO 50 specifications, to receive a small-diameter tool that is normally equipped immediately forward of its spindle with a quick-change collar. In addition the adapter body is provided internally with a connector rod that is at least limitedly axially displaceable in the body and that has a rear end shaped like the stem head of the large-diameter tool the spindle was built for, for instance to ISO 60 specifications. This spindle is spring-biased forward in the adapter body and carries a set of jaws that work like the jaws of the spindle but that are smaller. Thus the jaws of the spindle grip the head of the connector rod to pull it back and in turn the jaws of the connector rod grip the head of the tool and pull it back, simultaneously seating the adapter stem in the spindle bore and the tool stem in the adapter bore. Forward displacement of the spindle rod pushes the connector rod forward which in turn abuts the tool to knock it free of the adapter. In addition releasable fasteners are provided that hold the adapter body on the spindle so that the adapter can only be taken off the spindle by separate action on these fasteners.

Other systems (see German patent document No. 2,419,896 and *Aachener Werkzeugmaschinen-Kolloquium* 1984, 7-8 June 1984, page 164, FIG. 24) operate similarly and are particularly set up for automatic machining operations where the tools are of modular sized and are changed out by robots or the like. The use of adapters is particularly troublesome because they invariably add considerably to the length of the tool. Such extra length makes it necessary to reset the machine when switching from a large-diameter tool used without an adapter to a smaller-diameter one that must be mounted in an adapter to be chucked in the spindle.

OBJECTS OF THE INVENTION

It is therefore an object of the present invention to provide an improved machine-tool adapter.

Another object is the provision of such an improved machine-tool adapter which overcomes the above-given disadvantages, that is which is of simple construction, which is easy to install on and remove from the spindle, which is easy to chuck a tool in and dechuck a tool from, and which is of very short axial length.

SUMMARY OF THE INVENTION

The instant invention is used in combination with a machine spindle rotatable about an axis, formed with an axially centered forwardly flared large-diameter seat, provided in the seat with at least two axially and radially displaceable spindle jaws, having an axially displaceable actuating rod axially coupled with the jaws, and formed with cam formations engageable with the jaws to move same together on axial rearward displacement. It is also used with a transfer body or a tool that is normally also centered on the axis and formed with an axially centered rearwardly tapered small-diameter stem substantially smaller than the seat. The invention is an adapter comprising an adapter body normally centered on the axis and formed with a forwardly open small-diameter adapter seat complementary with the tool stem, a rearwardly projecting adapter stem snugly receivable in the large-diameter seat of the spindle, a flange flatly engageable with the front end of the spindle when the stem is in the spindle seat, and at least one rearwardly projecting tongue having a radially deflectable rear end engageable between a respective one of the jaws and the spindle when the stem is in the spindle seat to press the one jaw radially inward. A connector rod is axially limitedly displaceable in the adapter body between a front position and a rear position and has a rear end formed as a head engageable by the jaws. At least one member engageable between the rod and the tool stem to lock the tool in the adapter seat when the connector rod is in the rear position.

The tongue of the adapter body according to this invention therefore pushes the spindle jaw inward to lock on the connector rod of the adapter body. Thus when subsequently the inertial, hydraulic, or pneumatic actuating element of the spindle is pulled back, the jaws are already locked on the head of the connector rod so that the full stroke of the locking element is available for tightening the adapter body in the spindle. This is in sharp contrast to the prior-art systems where the first portion of the rearward stroke of the locking element serves to cam the jaws inward so that only a portion of the locking-element stroke actually serves for locking in the adapter.

According to this invention the adapter body is formed with two such tongues. The stem has a substantially frustoconical outer surface and the tongues have outer surfaces forming forward continuations of the stem outer surface and of the same apex angle as same. This helps in centering the adapter body on the spindle and fitting it into the spindle.

The rear ends of the tongues project radially outward past a forward continuation of the outer surfaces of the tongues and adapter stem. In addition the rear ends of the tongues have inner surfaces complementary to respective outer surfaces of the respective jaws. These tongues have relatively flexible forward attachment regions where they join the adapter stem but otherwise are substantially rigid and inflexible.

The adapter of this invention also has a locking element radially displaceable in the adapter body between outer and inner positions and a radially inwardly open recess in the spindle in which the locking element is receivable in its outer position. A transfer body engageable in the adapter seat has a formation engageable with the locking element for displacing it between its inner and outer positions on relative rotation of the transfer body and the adapter. A spring urges the locking element into its outer position.

The adapter body includes a core sleeve surrounding the connecting rod and formed with a radially throughgoing hole and the connecting rod is formed with a recess radially alignable with the hole only in the front position of the connecting rod. Thus locking member is engaged in the hole and with the rod and tool stem for locking same in the adapter seat only in the rear position of the rod. What is more, springs in the adapter urging the rod into the rear position. The coupling body is a ball.

The system of this invention can also have a radial screw locking the sleeve axially nonmovably in the adapter body and a screw engaged through the flange with the spindle for securing the adapter on the spindle. The adapter body is provided around the mouth of its seat with a bumper ring and a spring urges the actuating rod of the spindle axially backward.

DESCRIPTION OF THE DRAWING

The above and other objects, features, and advantages will become more readily apparent from the following, it being understood that any feature described with reference to one embodiment of the invention can be used where possible with any other embodiment and that reference numerals or letters not specifically mentioned with reference to one figure but identical to those of another refer to structure that is functionally if not structurally identical. In the accompanying drawing.

SPECIFIC DESCRIPTION

Figure 2A:
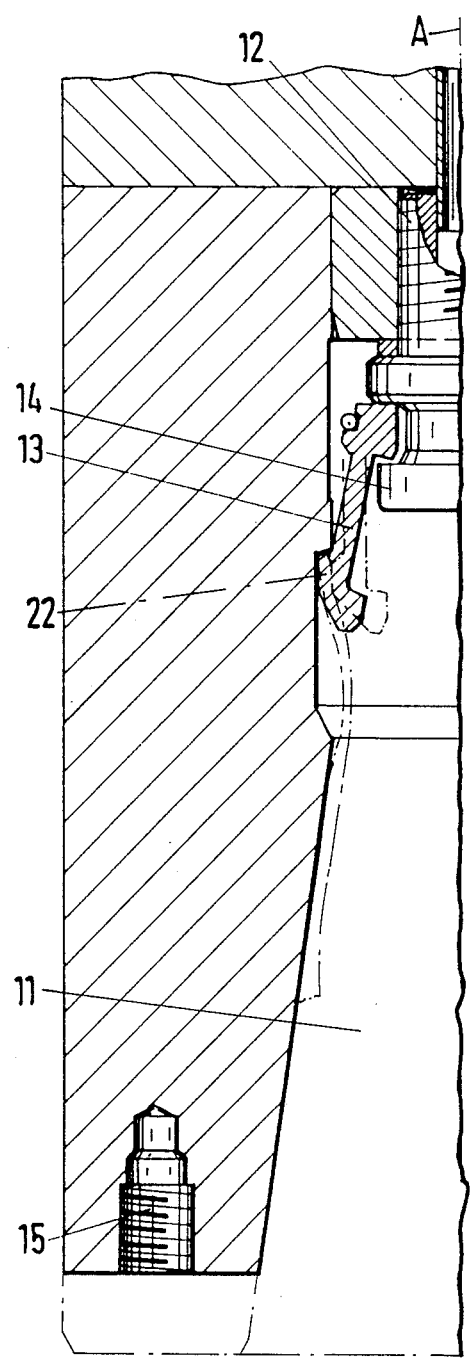
FIGS. 2A and 2B are axial sections through the spindle in the releasing and holding positions, respectively.
Figure 2B:
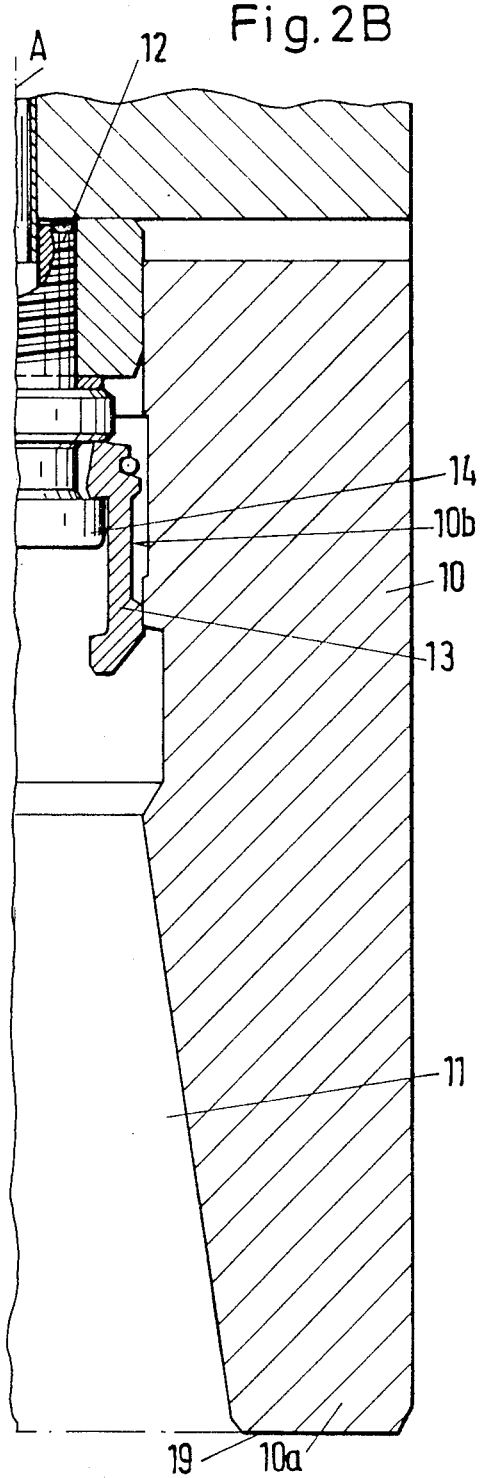

As seen in FIGS. 2A and 2B a machine-tool spindle 10 centered on an axis A has centered on this axis A a frustoconical large-diameter seat 11 opening at a front end 10a of the spindle 10. Internally the spindle 10 has an actuating rod 12 having a front end equipped with a head 14 provided with jaws 13. The rod 12 and the jaws 13 can move between the front position of FIG. 2A and the rear position of FIG. 2b, and the jaws 13 coact with cam surfaces 10b so that on movement from the front position to the rear position they also move radially inward from a spread position shown in solid lines in FIG. 2A to a gripping position shown in dot-dash lines in FIG. 2A and in solid lines in FIG. 2B. At its front end 10a the spindle 10 is set back on one side and formed with a threaded bore 15 provided for mounting an adapter carrying body.

Figure 1A:
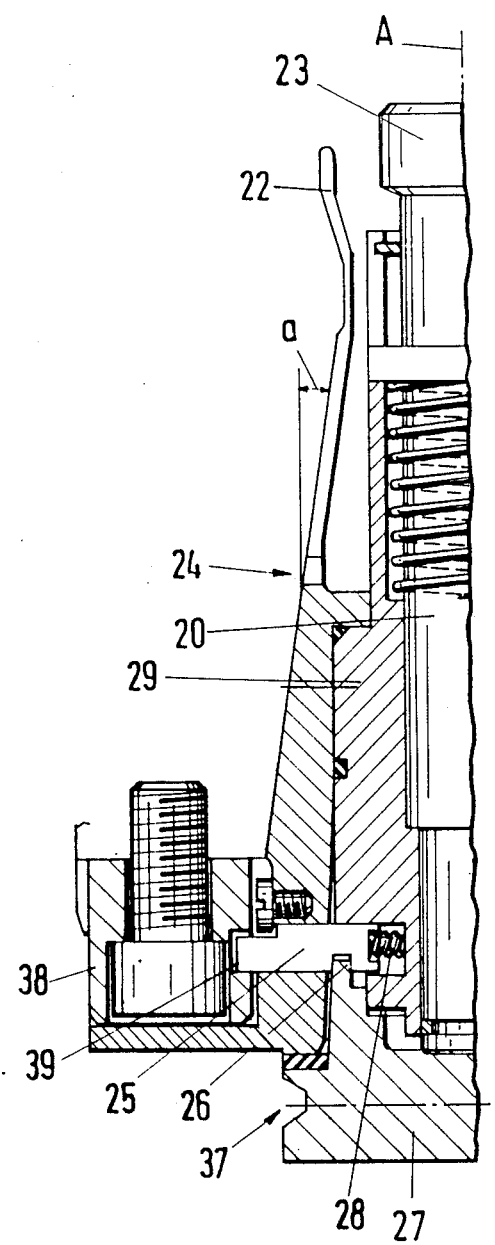
FIGS. 1A and 1B are axial sections through the adapter according to this invention in the rest and loaded positions, respectively.
Figure 1B:
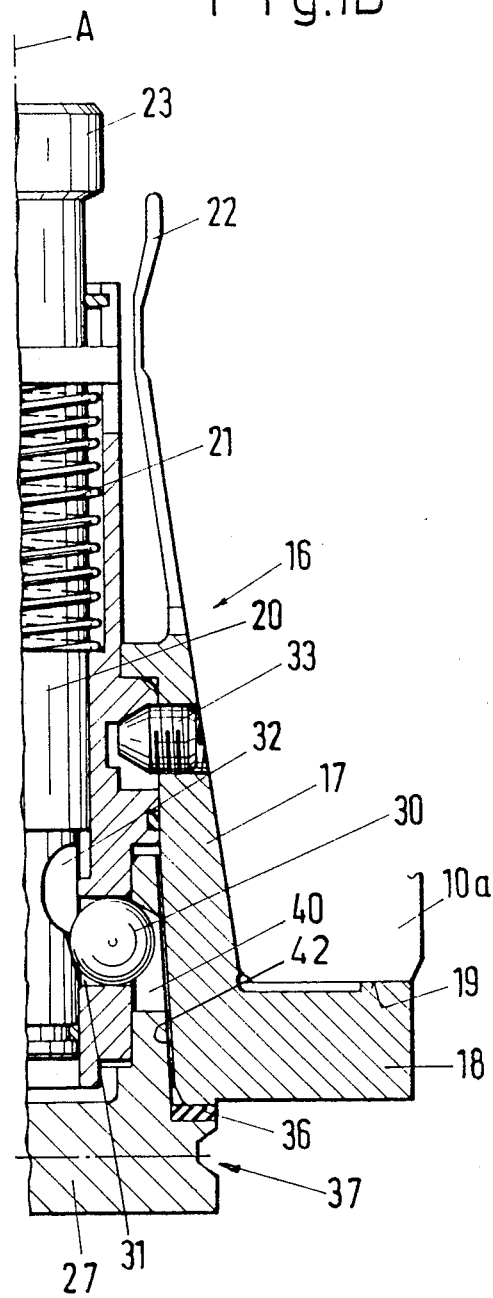

FIGS. 1A and 1B show an adapter 16 having a body basically formed by a stem 17 complementary to the seat 11 and a flange 18 adapted to sit against a front face 19 of the front end of the spindle 10. The adapter has a central core sleeve 29 locked in place by radial screws 33 and itself centrally axially receiving a connector rod 20 urged axially backward by a spring 21 and having at its rear end a head 23 that can be engaged as is known per se between the front ends of the jaws 13. This rod 20 is displaceable between a front position shown in FIG. 1A and a rear position shown in FIG. 1B, movement between these positions being controlled by whatever actuator controls axial movement of the rod 12.

Figure 3A:
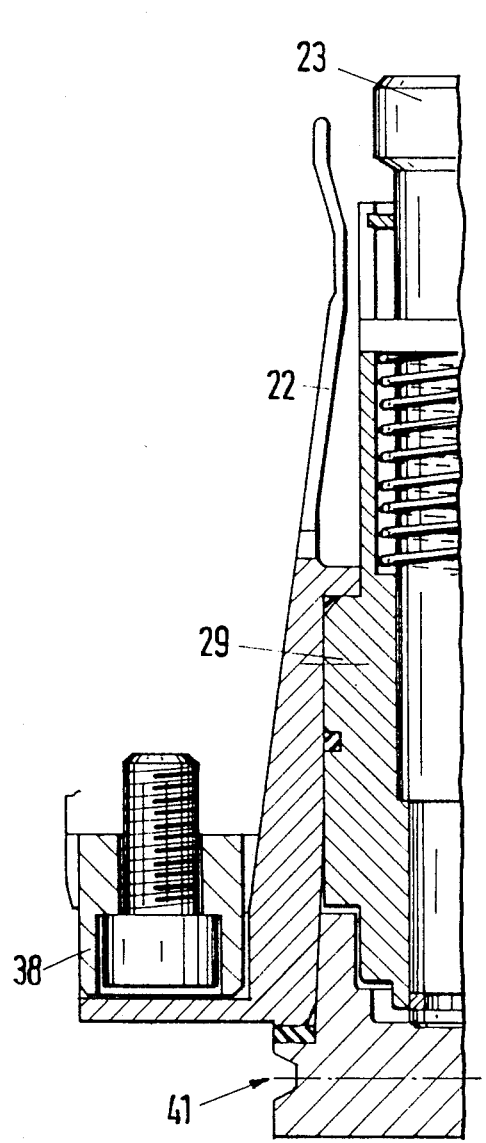
FIGS. 3A and 3B are views like FIGS. 1A and 1B, respectively, showing another adapter according to the invention.
Figure 3B:
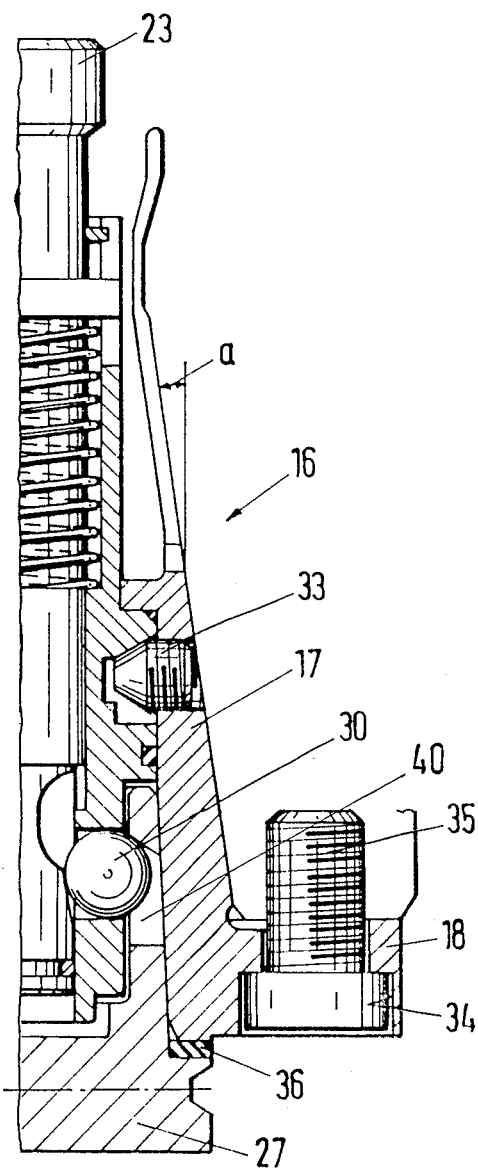

The sleeve 29 forms a forwardly open small-diameter seat 42 and is formed with a radially throughgoing hole 31 that can be aligned in the FIG. 1A forward position of the rod 20 with a recess 32 in this rod 20 and that holds a ball 30 that can fit into a pocket 40 formed in the stem of a transfer body 27 or tool 41 the latter shown partially in (FIGS. 3A and 3B). Thus in the front position of the rod 20 the ball 30 can slip into the recess 32 and out of the recess 40 to allow the transfer body 27 or tool 41 to move axially in and out of the front end of the adapter, but in the rear position the ball 30 is forced into the recess 40 to lock it in place. Instead of the ball 30, it is also possible to use a pin as coupling element.

According to this invention the stem 17 forms an apex angle a with the axis A and is formed with two diametrally opposite rearwardly extending tongues 22 that extend back at the angle a, that is they form rearward continuations of the outer surface of the stem 17. The rear ends of these tongues 22 are bent outward and are positioned generally level with the head 23 in the forward position of same so that they can engage radially outward of the jaws 13 and push same inward to lock on the forwardly directed shoulder formed at the front edge of the head 23. At their front ends 24 the tongues 22 are weakened, normally by drill holes through them here, so that they flex at this location. The rear ends of the tongues 22 are also curved to fit complementarily around the respective jaws 13.

Thus when the adapter 16 is inserted into the seat 11 the tongues 22 will engage behind the jaws 13 and push them into position around the head 23. When subsequently the rod 12 is retracted, its entire axial stroke serves to pull back the rod 23 and pull the transfer body 27 or tool head 41 back into the adapter.

Both the transfer body 27 and tool head 41 can be formed with a gripper ring 37 for engagement with an automated tool-transfer device. In addition the stem 17 carries a radially displaceable locking member 25 that can engage radially outward in a recess 39 in an alignment block 38 bolted to the spindle 10. A spring 28 urges the locking element 25 outward and a spiral cam 26 formed on the transfer body 27 serves to move it radially inward for removal.

Thus according to this invention when the adapter 16 is to be mounted to a spindle 10 it is picked up by a transfer body 27 that is rotated relative to the adapter 16 such that its cam 26 retracts the locking pin 25 radially back into the adapter 16. Then the adapter 16 is fitted to the seat 11 as described above and the body 27 is pulled out, allowing the spring 28 to push out the pin 25 to lock the adapter 16 in place. For subsequent removal the transfer body 27 is refitted to the adapter 16 and is rotated so that the cam 26 pulls the pin 25 radially back inward, out of engagement in the recess 40. Once the adapter 16 is in place, the transfer body 27 is removed, returned to its rack, and the automatic tool changer selects the necessary tool, such as a milling head, and fits it to the adapter 16.

The system of FIGS. 3A and 3B is similar to that of FIGS. 1A and 1B except that its flange 18 is formed with holes 34 through which pass bolts 35 that secure it in place on the spindle 10 once it is in position. The bumper ring 36 of the transfer body 27 is composed of plastic material and protects the adaptor front face against damage. The plastic bumper ring can be glued on.

We claim:

1. In combination with:
    a machine spindle
        rotatable about an axis
        formed with an axially centered forwardly flared large-diameter seat,
        provided in the seat with at least two axially and radially displaceable spindle jaws,
        having an axially displaceable actuating rod axially coupled with the jaws, and
        formed with cam formations engageable with the jaws to move same together on axial rearward displacement; and
    a tool
        normally also centered on the axis, and
        formed with an axially centered rearwardly tapered small-diameter stem substantially smaller than the seat; an adapter comprising:
    an adapter body normally centered on the axis and formed with
        a forwardly open small-diameter adapter seat complementary with the tool stem,
        a rearwardly projecting adapter stem snugly receivable in the large-diameter seat of the spindle,
        a flange flatly engageable with the front end of the spindle when the adapter stem is in the spindle seat, and
        at least one rearwardly projecting tongue having a radially deflectable rear end engageable between a respective one of the jaws and the spindle when the adapter stem is in the spindle seat to press the one jaw radially inward;
    a connector rod axially limitedly displaceable in the adapter body between a front position and a rear position and having a rear end formed as a head engageable by the jaws;
    at least one locking member engageable between the rod and the tool stem to lock the tool in the adapter seat when the connector rod is in the rear position.

2. The combination defined in claim 1 wherein the adapter body is formed with two such tongues.

3. The combination defined in claim 1 wherein the adapter stem has a substantially frustoconical outer surface and the tongues have outer surfaces forming forward continuations of the stem outer surface and of an apex angle substantially identical to an apex angle of the stem outer surface.

4. The combination defined in claim 3 wherein the rear ends of the tongues project radially outward past a forward continuation of the outer surfaces of the tongues and adapter stem.

5. The combination defined in claim 3 wherein the rear ends of the tongues have inner surfaces complementary to respective outer surfaces of the respective jaws.

6. The combination defined in claim 3 wherein the tongues have relatively flexible forward attachment regions where they join the adapter stem but otherwise are substantially rigid and inflexible.

7. The combination defined in claim 1, further comprising:
    a locking element radially displaceable in the adapter body between outer and inner positions;
    means forming a radially inwardly open recess in the spindle in which the locking element is receivable in its outer position; and
    a transfer body engageable in the adapter seat and having a formation engageable with the locking element for displacing it between its inner and outer positions on relative rotation of the transfer body and the adapter.

8. The combination defined in claim 7, further comprising
    a spring urging the locking element into its outer position.

9. The combination defined in claim 1 wherein the adapter body includes a core sleeve surrounding the connector rod and formed with a radially throughgoing hole, the connector rod being formed with a recess radially alignable with the hole only in the front position of the connector rod, the locking member being engaged in the hole and with the rod and tool stem for locking same in the adapter seat in the rear position of the rod.

10. The combination defined in claim 9, further comprising
    springs in the adapter urging the rod into the rear position.

11. The combination defined in claim 9 wherein the locking member is a ball.

12. The combination defined in claim 9, further comprising
    a radial screw locking the sleeve axially nonmovably in the adapter body.

13. The combination defined in claim 1, further comprising
    a screw engaged through the flange with the spindle for securing the adapter on the spindle.

14. The combination defined in claim 13, wherein the adapter body is provided around the mouth of its seat with a bumper ring.

15. The combination defined in claim 1, further comprising
    spring means urging the actuating rod of the spindle axially backward.

* * * * *